United States Patent [19]
Mott

[11] 3,802,821
[45] Apr. 9, 1974

[54] SPINNERETTE HEAD

[76] Inventor: Lambert H. Mott, c/o Mott Metallurgical Corp., P.O. Drawer L, Farmington Industrial Pk., Farmington, Conn. 06032

[22] Filed: Feb. 12, 1973

[21] Appl. No.: 331,506

[52] U.S. Cl.............. 425/192, 425/198, 425/199
[51] Int. Cl............................ B29c 13/00, B29f 3/00
[58] Field of Search .......................... 425/190–192, 425/197–199, 382.2, 461–467, DIG. 49; 210/348, 359, 455, 470, 471, 473, 477, 484, 486, 495; 264/176 F, 177 F, 177 R, 178 F

[56] References Cited
UNITED STATES PATENTS

| | | | |
|---|---|---|---|
| 1,822,006 | 9/1931 | Bull................................ | 210/359 X |
| 2,881,474 | 4/1959 | Sellers et al. ................ | 425/DIG. 49 |
| 3,570,059 | 3/1971 | Mott................................ | 425/192 |
| 3,716,317 | 2/1973 | Williams et al................. | 425/198 |

Primary Examiner—Charles W. Lanham
Assistant Examiner—E. M. Combs
Attorney, Agent, or Firm—Peter L. Tailer

[57] ABSTRACT

A spinnerette head for the extrusion of synthetic polymer fibers incorporates an extended area filter having a base with porous tubular filter elements extending from the base. The base is clamped and sealed between an inlet head and elements including a spinnerette disk containing extrusion apertures so that the tubular filter elements extend into a central cavity in the inlet head. At least the edge of the base plate is unwetted by the polymer and is available to be used to remove the extended area filter when the spinnerette head is disassembled for maintenance purposes.

7 Claims, 3 Drawing Figures

SPINNERETTE HEAD

BACKGROUND OF THE INVENTION

Spinnerette heads for the extrusion of synthetic polymer fibers must be disassembled after periods of operation to clean their filter elements and for other purposes. In conventional practice, it is usual to place the entire extended area filter within a cavity in the spinnerette head. With an extended area filter such as that shown in my U.S. Pat. No. 3,570,059 it is difficult to remove the filter from the cavity which may be filled with solidified synthetic polymer. While the spinnerette head may be heated to melt the polymer, it is a viscous substance and makes it a difficult and messy job to perform an extraction from within a cavity.

SUMMARY OF THE INVENTION

A spinnerette head for the extrusion of synthetic polymer fibers has an inlet head containing a large central cavity, a filter base fixed below the inlet head, extended area tubular porous filter elements fixed in the base and extending into the central cavity of the inlet head, and elements including a spinnerette disk containing extrusion apertures fixed below the filter base. The upper and lower surfaces of the filter base are clamped and sealed between the inlet head and the elements therebelow so that the edge of the filter base plate is unwetted by synthetic polymer and is freely accessible for easier disassembly of the spinnerette head.

DESCRIPTION OF THE PREFERRED EMBODIMENT

Figure 1:
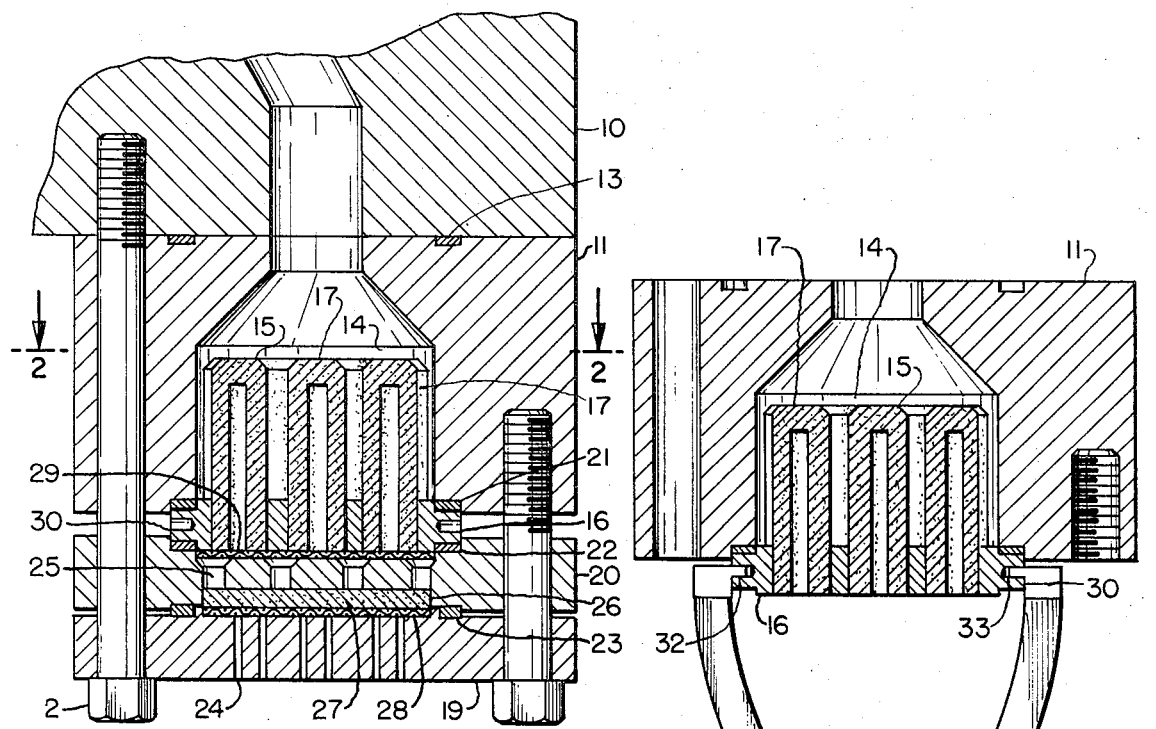
FIG. 1 is a longitudinal section through a spinnerette head according to this invention.
Figure 2:
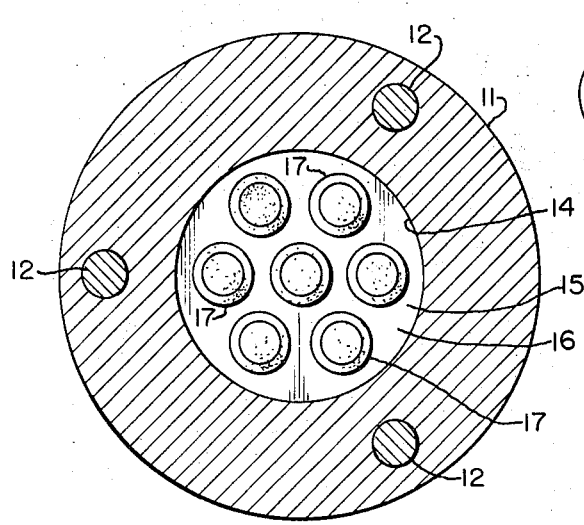
FIG. 2 is a transverse section taken on line 2—2 of FIG. 1.

As shown in FIG. 1, a spin block 10 has one or more inlet heads 11 fixed thereto by three bolts 12. Each inlet head is sealed by means of an annular gasket 13. Inlet head 11 contains a large central cavity 14 which extends to the bottom surface of the inlet head. An extended area filter 15 has a base 16 in which are fixed the porous filter tubes 17. The tubes 17 extend upward into cavity 14 and provide an entrance filter area at least twice that of the cross sectional area of cavity 14.

Bolts 18 fix spinnerette disk 19 and breaker plate 20 to clamp base 16 between plate 20 and inlet head 11. Seals 21 and 22 render the jointing of these elements extrusion pressure tight. Seal 23 joins the spinnerette disk 19 to breaker plate 20. Spinnerette disk 19 contains extrusion apertures 24 and breaker plate 20 contains passages 25 which lead from extended area filter 15 to a cavity 26 containing a shear control disk 27 resting on a screen 28. The shear control disk 27 is provided if it is necessary to increase pressure drop through the spinnerette head to give rise to sufficient shear to condition the polymer being extruded. A screen 29 may be provided to support the base 16 of the extended area filter 15.

Figure 3:
FIG. 3 is a longitudinal section through an inlet head and an extended area filter, an extraction tool being shown fixed to the extended area filter for its removal from the inlet head.

As may be seen in FIG. 1, the edge 30 of base 16 is not contacted by the molten polymer. Thus, when the spinnerette head is disassembled as shown in FIG. 3, an extraction tool 31 has fingers 32 which are inserted into radial apertures 33 formed in the edge 30 of base 16. Extended area filter 15 may then be easily removed from cavity 14. Filter 15 may be extracted from cavity 14 even when cavity 14 is full of polymer. In practice, this invention has turned out to be a great advantage when the spinnerette head is disassembled for cleaning the filter elements 17, changing a spinnerette disk 19, and for other maintenance purposes.

While a tong type of extraction tool 31 is shown, equivalent types of extraction tools may be used. Also, while tubular extended area filter elements 17 are shown, this invention may use extended area filters having other shapes of projecting porous filter elements. In addition, while a circular spinnerette disk 19 and extended area filter base 16 are shown, these terms include oval, elongated, kidney shaped, and other conventional spinnerette head configurations.

What is claimed is:

1. A spinnerette head for the extrusion of synthetic polymer fibers comprising, in combination, an inlet head containing a large central cavity, an extended area filter having a base and porous filter elements extending therefrom, said base being larger than and covering said cavity, additional spinnerette head elements including a spinnerette disk containing extrusion apertures fixed below said base, and seals above and below said base so that said base is clamped between said inlet head and said spinnerette head elements and sealed by said seals to be extrusion pressure tight, said spinnerette head elements containing passages communicating between said base and said extrusion apertures of said spinnerette disk, said porous filter elements projecting into said large central cavity of said inlet head and having an entrance filter area greater than the cross sectional area of said cavity, said base having an outer edge unwetted by synthetic polymer.

2. The combination according to claim 1 with the addition of an extraction tool and wherein said outer edge of said extended area filter base is adapted to be grasped by said extraction tool for removal of said extended area filter from said inlet head.

3. The combination according to claim 2 wherein said outer edge of said base contains apertures and said extraction tool has fingers entering said apertures.

4. The combination according to claim 3 wherein said extraction tool is a tong.

5. The combination according to claim 2 wherein said spinnerette head elements comprise said spinnerette disk and a breaker plate containing said passages communicating between said base and said extrusion apertures, and with the addition of a third seal between said breaker plate and said spinnerette disk sealing said plate and said disk extrusion pressure tight.

6. The combination according to claim 5 wherein said breaker plate contains a cavity adjacent to said spinnerette disk, and with the addition of a shear control disk within the cavity of said breaker plate.

7. The combination according to claim 5 with the addition of bolts fixing said spinnerette disk to said inlet head and clamping said breaker plate, said base, and said seals therebetween.

* * * * *